(No Model.)  4 Sheets—Sheet 1.
J. H. VAILE.
PROCESS OF AND APPARATUS FOR COOKING OIL MEAL.
No. 308,112.  Patented Nov. 18, 1884.
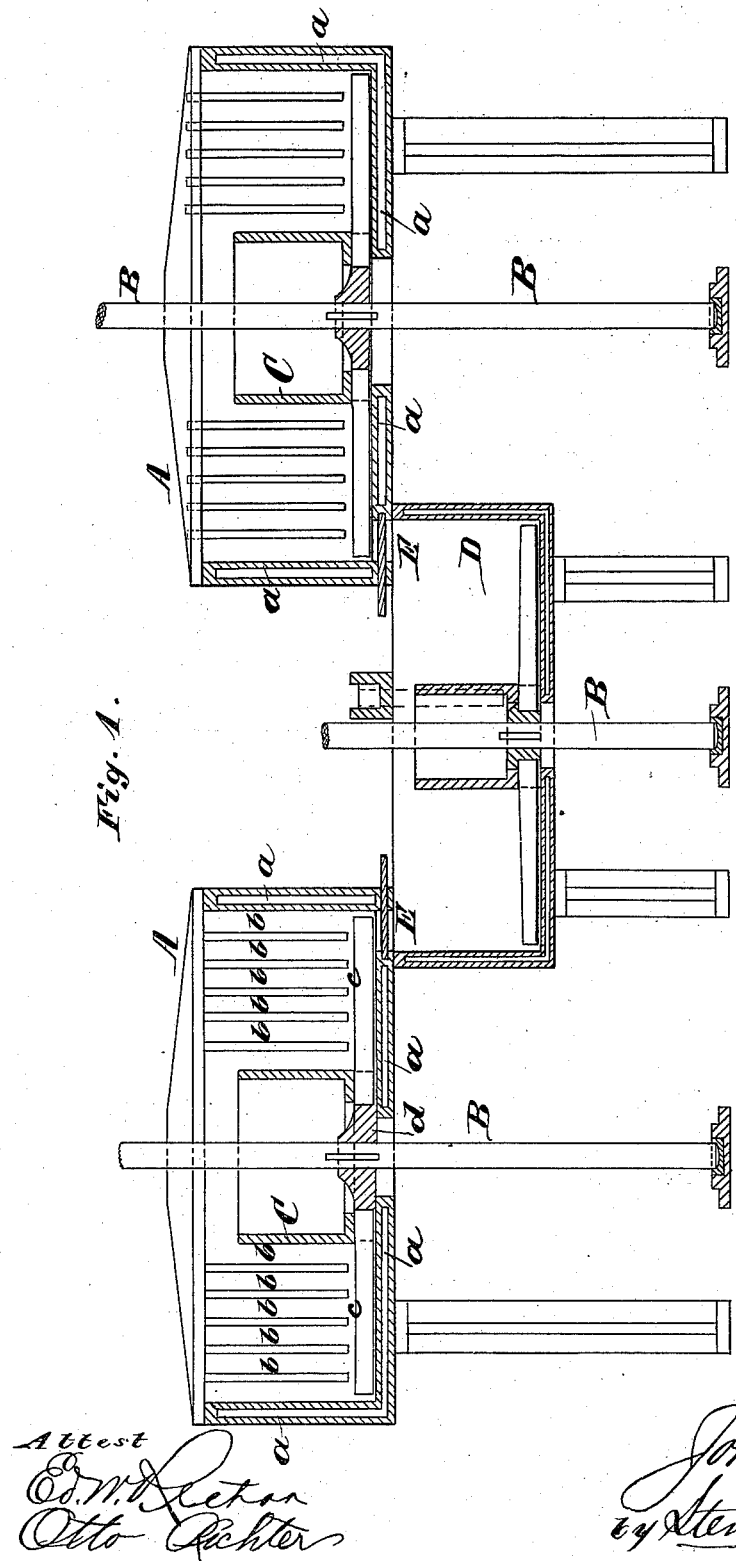
Fig. A.
Attest  
Ed. W. Leeton  
Otto Richter
Inventor  
John H. Vaile  
by Stem & Beck his Atty's (No Model.)
4 Sheets—Sheet 2.
J. H. VAILE.
PROCESS OF AND APPARATUS FOR COOKING OIL MEAL.
No. 308,112. Patented Nov. 18, 1884.
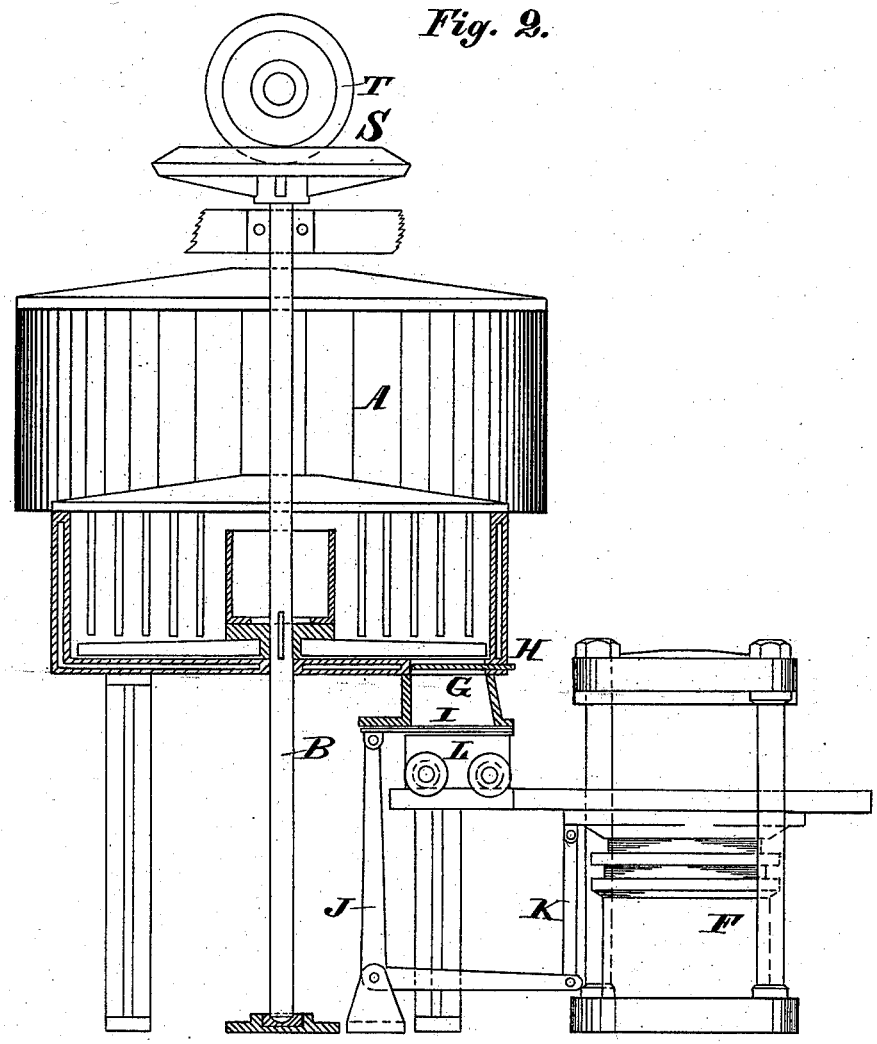

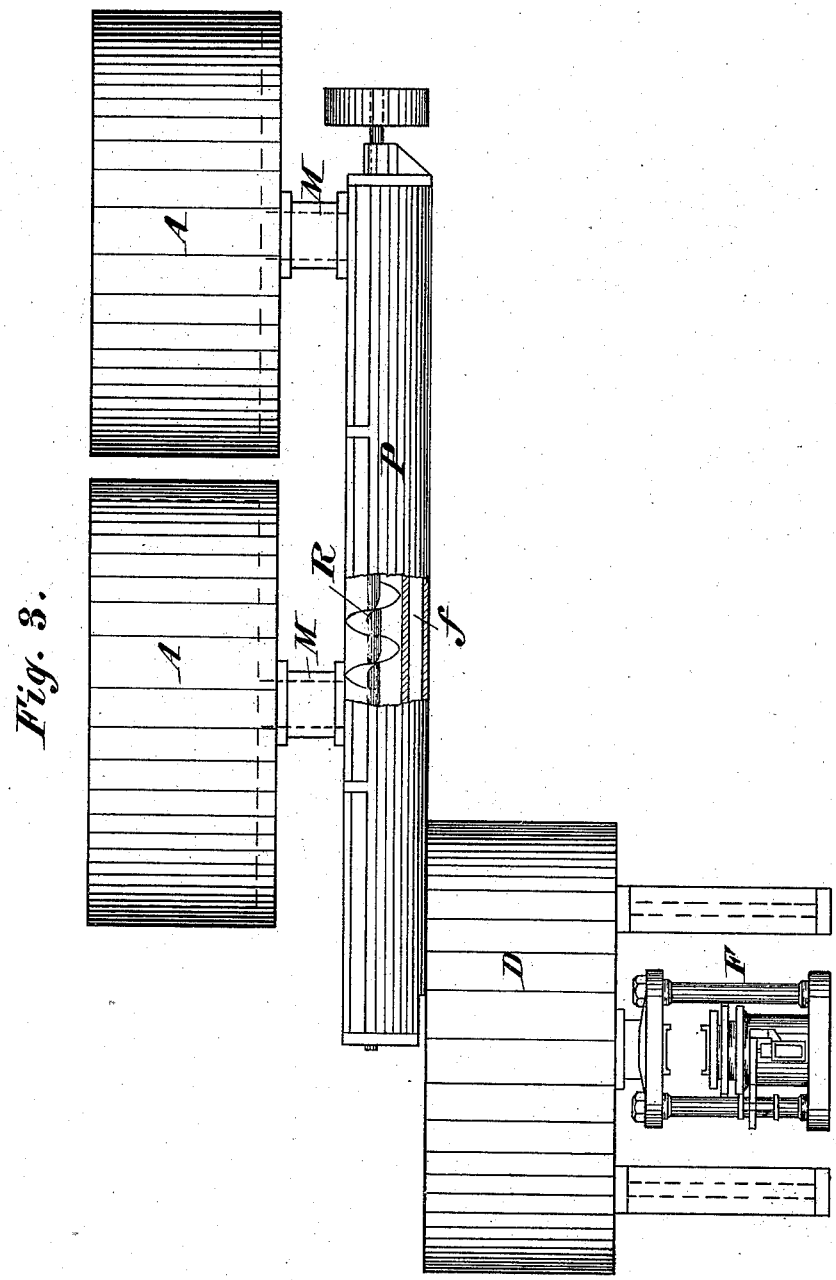

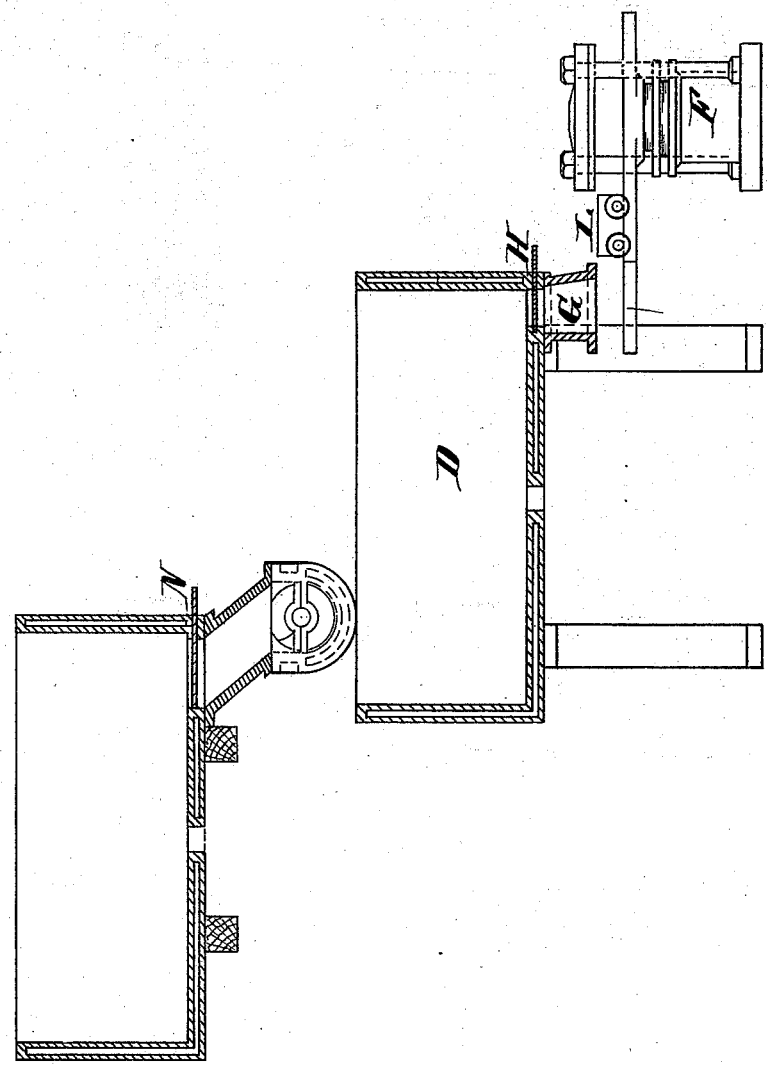

UNITED STATES PATENT OFFICE.

JOHN H. VAILE, OF DAYTON, OHIO.

PROCESS OF AND APPARATUS FOR COOKING OIL-MEAL.

SPECIFICATION forming part of Letters Patent No. 308,112, dated November 18, 1884.

Application filed May 9, 1884. (No model.)

*To all whom it may concern:*

Be it known that I, JOHN H. VAILE, a citizen of the United States, residing at Dayton, in the county of Montgomery and State of Ohio, have invented certain new and useful Improvements in the Process of and Apparatus for Cooking Oil-Meal, of which the following is a full, clear, and exact description, reference being had to the accompanying drawings, forming a part of this specification.

My invention relates to an improvement in the process of and apparatus for cooking or preparing oil-meal preparatory to subjecting the same to pressure to form the cakes from which the oil is afterward expressed. As hitherto conducted, the cooking of the meal was carried on in a single tank or reservoir properly heated by steam, in which the meal was cooked, and from which it was directly drawn into the filling-hoppers as needed until the tank was empty, so that considerable time was lost in refilling the tank and cooking a second supply. Also, in these old cookers the meal, while being cooked, was subjected to the action of rotary stirrers or knives, which had a tendency to pile up the meal around the outer side of the tank, leaving the central portion bare and exposed to loss of heat, whereby it would be unevenly and improperly cooked, as the heat would find its way through the thinner portions and not penetrate the thicker portions.

The objects of my invention are to prevent the loss of time in cooking and to insure the thorough and equal cooking of the meal; and the first object of my invention I accomplish by having one or more cooking-tanks combined with a storage-tank, into which latter the meal, when cooked, can be instantly drawn from either of the cooking-tanks, while the cooking-tanks can be at once refilled with a second charge, which is being cooked while the meal is being taken from the storage-tank.

The second object of my invention I accomplish by preventing the uneven distribution or spreading of the meal in the cooking-pans by confining the meal in a substantially annular space.

The novelty of my invention consists in the construction, combination, and arrangement of the means employed, all as will be herewith set forth and specifically claimed.

In the accompanying drawings, Figure 1, Sheet 1, is a central sectional view in front elevation of my improved apparatus. Fig. 2, Sheet 2, is an end elevation of the same, with the storage-tank in central section. Fig. 3, Sheet 3, is a front elevation, including a modification of the apparatus. Fig. 4, Sheet 4, is a sectional end elevation of Fig. 3.

The same letters of reference are used to indicate identical parts in all the figures.

Referring now to Figs. 1 and 2, A A are cylindrical cooking-tanks, heated in any suitable manner, but preferably surrounded by a steam-jacket, to form steam-spaces $a$ upon the sides or bottom, or both, into which live steam is introduced to heat or cook the meal, by which it is brought into that condition in which it will most readily yield its oil when pressed, and as this condition is one of great nicety, requiring care and caution both to cook the meal sufficiently and to prevent its overcooking, it is necessary either to cut off the heat or remove the contents from the cooker, or both, at the proper moment. These cooking-tanks have two or more rows of vertically-suspended blades or knives, $b$, properly supported, and under which two or more blades or knives, $c$, preferably segmental in shape, and attached to a hub, $d$, keyed or otherwise fastened upon a vertical revolving shaft, B, revolve just above the bottom of the tank. Also secured to the hub $d$, or forming part thereof, if desired, is a central cylinder, C, between the periphery of which cylinder and the wall of the tank the meal to be cooked is confined. As seen, there are in this instance two of these cooking-tanks, properly supported, and with their edges projecting over a third tank, D, resembling the other tanks, and which I term the "storage-tank."

E E are suitable traps in the bottoms of the tanks A, opening into the tank D, through which the meal, when cooked, is drawn from the tanks A into the storage-tank D.

F, Fig. 2, is any suitable forming-press, but it is preferably such a press as that for which I have concurrently with this made application for Letters Patent.

G, Fig. 2, is a trap in the bottom of the tank D, which trap is closed at its upper end by a gate or slide, H, to be operated by hand, and at its lower end by an automatic gate or slide, I, connected by a bell-crank, J, and link K to the plunger or platen of the press F in such manner that as the press ascends to form a cake the slide I is drawn back, permitting a charge of meal to be deposited in the filling-hopper L, which is placed under the trap G. As the press descends the slide I is closed and the meal-hopper, which is preferably on rollers, is passed over the meal-box of the press, for the purpose of filling the same with a charge of meal, after which it is drawn back under the trap G as before, and so the operation continues rapidly and without interruption.

By the employment of the cylinder C, which may be either stationary or may revolve, it will be readily understood that the meal in the cookers is kept of equal depth or density throughout, and will not, by the action of the stirrers C, be piled up against the outer walls of the cooker, and thus it is evenly subjected to the action of the heat and becomes thoroughly cooked throughout. By means of the vertical knives $b$ the formation of what are known as "water-balls" is prevented, or, if they are formed, they are readily broken up. From this arrangement it will be understood that when the contents of either of the tanks A are cooked they are at once drawn off into the storage-tank D, to the jacket of which only a sufficient amount of steam is admitted to keep up the proper degree of heat without cooking, and the cooker is again filled. In the meantime the meal is being drawn off from the storage-tank and supplied to the forming-press, and thus the storage-tank would be emptied before a second supply of meal would be cooked if it were not for the other cooker A, which is by this time ready to be emptied into the storage-tank, and so the storage-tank is kept constantly supplied, while the cookers A are intermittently discharged into it, and so loss of time and danger of improperly-cooking the meal is absolutely prevented.

By reference to Figs. 3 and 4 the modification to which I have referred will be illustrated. It consists merely in locating the cookers A so that they discharge through traps M, closed by slides N, into a conveyer-chamber, P, surrounded by a steam-jacket to form a steam-space, $f$, and supplied with any suitable conveyer, preferably a constantly-revolving substantially horizontal screw-conveyer, R. This conveyer-chamber extends over and opens into the storage-tank D. By this means the cooked meal is conveyed from the cookers A into the storage-tank, as will be readily understood.

It is not essential that the slide of the trap G should be automatic; but where it is, as shown in Fig. 2, the gate H is left constantly open so long as the press is in operation; but, as seen in Fig. 4, the lower gate, I, may be dispensed with and the gate H operated by hand to charge the hopper L.

The steam-connections can be made from the boiler in the usual or any suitable manner, and the shafts B, as seen in Fig. 2, may be driven by beveled pinions S T, the latter of which may be upon a line-shaft.

Having thus fully described my invention, I claim—

1. The herein-described process of treating oil-meal for pressure, consisting in cooking said meal in one or more cookers connected with a storage-heater, and in drawing the same, when cooked, from the cookers intermittently into the storage-heater, and in removing the meal from the storage-heater directly to the forming-press, whereby the meal reaches the forming-press in a properly-heated condition, and whereby a constant supply of cooked meal for the forming-press is kept up.

2. The combination and relative arrangement of one or more cookers, A, and storage-heater E, substantially as described.

3. The combination, with one or more cookers, A, and storage-heater D, of a conveyer, R, for conveying the meal from either of the cookers to the storage-heater, substantially as described.

4. An oil-meal cooker provided with two or more revolving blades or stirrers in which the cooking-chamber is annular, whereby the meal is kept of constant and even thickness or density, substantially as described.

5. An oil-meal cooker having revolving knives or blades and stationary knives or blades, and a central cylinder, C, as and for the purpose specified.

6. The combination, with one or more oil-meal cookers and a storage-heater, of an intermediate conveyer, substantially as described.

7. The combination, with one or more oil-meal cookers and a storage-heater, of an intermediate conveyer inclosed in or surrounded by a steam or heating jacket.

8. The combination, with a forming-press, a meal-reservoir, and a meal-hopper, of a gate or slide controlling the passage from the meal-reservoir, and lever mechanism uniting said gate or slide and the plunger or piston or platen of the press, whereby said gate or slide is automatically opened or closed, in the manner and for the purpose specified.

9. The combination and arrangement of the trap G, slide I, bell-crank J, link K, and press F with a meal-hopper, L, substantially in the manner and for the purpose specified.

JOHN H. VAILE.

Witnesses:
E. W. RECTAR,
OTTO RICHTER.

It is hereby certified that in Letters Patent No. 308,112, granted November 18, 1884, upon the application of John H. Vaile, of Dayton, Ohio, for an improvement in the "Process of and Apparatus for Cooking Oil-Meal," an error appears in the printed specification requiring correction, as follows: In line 86, page 2, the reference letter "E" should read $D$; and that the Letters Patent should be read with this correction therein that the same may conform to the record of the case in the Patent Office.

Signed, countersigned, and sealed this 8th day of February, A. D. 1887.

[SEAL.]
D. L. HAWKINS,
*Acting Secretary of the Interior.*

Countersigned:
R. B. VANCE,
*Acting Commissioner of Patents.*